(12) United States Patent
He

(10) Patent No.: US 8,133,391 B2
(45) Date of Patent: Mar. 13, 2012

(54) METHOD OF ECOLOGICAL RESTORATION OF WATER BODIES CONTAINING EXCESS NUTRIENT

(75) Inventor: Wenhui He, Shanghai (CN)

(73) Assignees: Shanghai Taihe Water Environmental Technology Development Co., Ltd., Chongming, Shanghai (CN); Wenhui He, Yangpu District, Shanghai (CN)

( * ) Notice: Subject to any disclaimer, the term of this patent is extended or adjusted under 35 U.S.C. 154(b) by 0 days.

(21) Appl. No.: 12/972,087

(22) Filed: Dec. 17, 2010

(65) Prior Publication Data

US 2011/0084021 A1     Apr. 14, 2011

Related U.S. Application Data

(63) Continuation-in-part of application No. 12/122,694, filed on May 17, 2008, now abandoned.

(51) Int. Cl.
    *C02F 3/32*         (2006.01)
    *C12N 1/12*         (2006.01)
    *C12N 1/16*         (2006.01)

(52) U.S. Cl. .................... 210/602; 435/255.1; 435/257.1

(58) Field of Classification Search ................... 210/602; 435/243, 255.1, 257.1
See application file for complete search history.

(56) References Cited

FOREIGN PATENT DOCUMENTS

CN          1884138 A    *   12/2006

OTHER PUBLICATIONS

Dawidowicz, Piotr; The effect of *Daphnia* on filament length of blue-green algae, (1990), Hydrobiologia, vol. 191, pp. 265-268.*
Rottmann et al.; Culture Techniques of *Moina*: The Ideal *Daphnia* for Feeding Freshwater Fish Fry, (1992), pp. 1-7; University of Florida, IFAS Extension.*

* cited by examiner

*Primary Examiner* — Fred Prince

(57) ABSTRACT

A method of ecological restoration of water bodies containing excess nutrient includes steps of: (a) taming *Daphnia magna* to be able to eat blue-green algae as an algae eating plankton with a taming composition fermented from spirulina powder, active yeast, and saccharide, so as to digest blue-green algae in the water bodies, and (b) putting the algae eating plankton in the water body polluted by the blue-green algae, wherein the algae eating plankton eats the blue-green algae, so that an eco-system of the water body containing excess nutrient can be restored. The method according to a preferred embodiment further includes a step of: (c) planting submerged plant in the water, wherein the submerged plant includes submerged forest and submerged turf.

20 Claims, No Drawings

METHOD OF ECOLOGICAL RESTORATION OF WATER BODIES CONTAINING EXCESS NUTRIENT

CROSS REFERENCE OF RELATED APPLICATION

This is a Continuation-In-Part application of a non-provisional application, U.S. application Ser. No. 12/122,694 filed on May 17, 2008, now abandoned.

BACKGROUND OF THE PRESENT INVENTION

1. Field of Invention

The present invention relates to a method of ecological restoration, and more particularly to a method of ecological restoration of water bodies containing excess nutrient, comprising a step of putting an organism that can eat blue-green algae in the water body polluted by the blue-green algae, so that an eco-system of the water body containing excess nutrients is restored.

2. Description of Related Arts

Many human producing activities discharge waste water rich in nitrogen and phosphorus to the rivers, lakes and so on. Under this situation, the self-purification capacity of water bodies is destroyed, and the nutrient s such as nitrogen and phosphorus accumulate and finally result in an outburst of unicellular algae, especially blue-green algae, in the water body. The blue-green algae are mainly aeruginosa. An overrun of the blue-green algae seriously pollutes the water bodies.

Most of the cells of blue-green algae have a developed algin layer, and are fully covered by a thick amylase substance. These algin and amylase are hardly digested by the digestant enzyme of any present organism, especially higher animals. Therefore, the emergence of the blue-green algae can not become part of food chain in the ecosystem. Domestic and overseas experts in environmental protection and biology try to use higher animals including fish to control the pollution caused by blue-green algae, but have not got ideal results.

Doubtlessly, adding chemical herbicide and flocculants in the water can kill the blue-green algae instantly. Chemical method is the easiest method to solve the problem, but the chemical and the catabolite finally run up to human bodies via the food chains. What's more important is that chemical treatment can not fundamentally solve this problem of eutrophication. Once the chemicals are decomposed and diluted, the algae will propagate again, and a constant chemical treatment is required.

When dissolved oxygen in water is high in value, the phosphate always crystallizes and becomes a chemical form; when dissolved oxygen in water is low in value, the phosphate will be dissolved in the water, so that charging gas to increase the oxygen content in water can reduce the solubility of phosphate so as to restrain the propagation of algae. In the process of the comprehensive biological management of the water containing excess nutrient, increasing oxygen to water is very helpful. However, only increasing oxygen can not solve the problem of eutrophication in water, the propagation of the algae is still inevitable for the nutrient recycle in the long run.

Microbiological preparation can improve the microbes in the water and substrate silt, and decompose and mineralize the organic matter and nutrient s, so as to stabilize some nutrient s in inertia form temporarily. The result is similar to the method of increasing oxygen. It is worth mentioning that the living of the microbes depends on the environment and demands absolute dominate populations. Generally, the microbe method may keep good operation status for 15-30 days. Once the conditions change, including climate, substrate, and various water qualities: dissolved oxygen, PH value, temperature and so on, more microbes need to be added continually, or outburst of blue-green algae may be more serious.

The algae have abundant nutrition and can decompose quickly, so that they are fine organic fertilizer. However, from the commercial perspective, the cost of fetching the algae is much higher than the algae being the organic fertilizer.

As we all know, aquatic plants, such as hyacinth, aquatic peanut, aquatic lotus, aquatic vegetables and aquatic flowers, do absorb nutrient in water, however they also cover the surface of lakes and blot out sunshine, which will lead some living creatures under water and silt, especially some deep-water plants to die, and what's more, will lead the nutrient in the silt to dissolve. Therefore, the disadvantages brought by aquatic plant far exceed the advantages.

SUMMARY OF THE PRESENT INVENTION

A main object of the present invention is to provide a method of ecological restoration of water bodies containing excess nutrient, comprising a step of putting an organism that can eat blue-green algae in the water body polluted by the blue-green algae, so that an underwater eco-system of the water body containing excess nutrients is restored.

Another object of the present invention is to provide a method of enabling a kind of plankton to be able to eat blue-green algae, so as to restore an underwater eco-system of the water bodies polluted by blue-green algae.

Another object of the present invention is to provide a method of ecological restoration of water bodies containing excess nutrition, wherein the nitrogen and phosphorus are transferred to a higher animal by food chain, and the higher animal is caught out of the water so as to realize a balance of the eco-system.

Another object of the present invention is to provide a method of ecological restoration of water bodies containing excess nutrients, which can quickly clean the severely and constantly polluted water bodies by excess nutrients, so as to restore the eco-system of the water bodies.

Another object of the present invention is to provide a method of ecological restoration of water bodies containing excess nutrients, which will not cause new pollution and any negative effect.

Accordingly, in order to accomplish the above object, the present invention provides a method of ecological restoration of water bodies containing excess nutrients further comprises steps of:

(a) taming *Daphnia magna* to be able to eat blue-green algae as an algae eating plankton with a taming composition fermented from spirulina powder, active yeast, and saccharide, so as to digest blue-green algae in the water bodies, and (b) putting the algae eating plankton in the water body polluted by the blue-green algae, wherein the algae eating plankton eats the blue-green algae, so that an eco-system of the water body containing excess nutrient can be restored.

These and other objectives, features, and advantages of the present invention will become apparent from the following detailed description, the accompanying drawings, and the appended claims.

DETAILED DESCRIPTION OF THE IMPLEMENTATION METHODS

A method of ecological restoration of water bodies containing excess nutrient according to a preferred embodiment comprises steps of:

(a) taming *Daphnia magna* to be able to eat blue-green algae as an algae eating plankton with a taming composition fermented from spirulina powder, active yeast, and saccharide, so as to digest blue-green algae in the water bodies, and (b) putting the algae eating plankton in the water body polluted by the blue-green algae, wherein the algae eating plankton eats the blue-green algae, so that an eco-system of the water body containing excess nutrient can be restored.

We all know that no present plankton is capable of digesting blue-green algae, so that in step (a), the *Daphnia magna* is tamed to be able to eat and digest the blue-green alga, which is explained hereinafter.

The taming composition is produced by composite fermenting spirulina powder, active yeast, and saccharide, so as to transform the spirulina powder into even, one-celled status for *Daphnia magna* to eat.

According to a preferred embodiment of the present invention, a process for producing the taming composition comprises:

dissolving saccharide and spirulina powder separately with water under 35-45° C.; activating yeast in the saccharide solution for 1-60 minutes; pouring the spirulina suspension into the activated yeast suspension; and then composite fermenting for at least 1 hours.

The proportion of spirulina power, active yeast, saccharide and water by weight is 1-20:1:1:10-100. Particularly, an example of the process is illustrated as below:

a) sterilizing containers;

b) boiling water and then reducing a temperature thereof to 40° C.;

c) dissolving the saccharide such as glucose and the spirulina powder separately with the water;

d) adding the active yeast into the saccharide solution to active for 10 minutes while keeping the temperature at 37° C.;

e) adding the spirulina suspension into the active yeast suspension;

f) fermenting the solution for at least 1 hours in a sealed container, wherein high pressure brought by fermenting should be released to ensure safety; and then g) storing the fermented solution at 4° C.

Preferably, the process further comprises:

h) adding stirred banana skin which has been sterilized under high temperature while fermenting, so as to enhance digesting of the *Daphnia magna*, wherein the stirred banana skin is 5%-30% of the solution in volume.

The *Daphnia magna* is fed with the taming composition for 15-50 ppm per day.

When feeding the *Daphnia magna*, 10-200 ppm photosynthetic bacteria is added.

Dissolved oxygen in the water taming the *Daphnia magna* is kept in 3-4 ppm.

PH of the water taming the *Daphnia magna* to is adjusted approximate to 8 with 1-100 ppm $Na_2CO_3$ termly, so as to simulate an alkaline environment when the *Microcystis aeruginosa* outbreak.

The *Daphnia magna* is continuously tamed for at least three generations to obtain a stable algae eating plankton.

When the blue-green algae in the water is up to 10 mg/L by dry weight, the *Daphnia magna* is put in by 5 g/m$^3$, i.e., 3-5 pieces/L. When the algae in the water is up to 100 mg/L by dry weight, the *Daphnia magna* is put in by 50 g/m$^3$, i.e., 30-50 pieces/L.

The step (a) comprises a step of: (a1) improving an intestinal microorganisms composition of the *Daphnia magna*, so as to enable the *Daphnia magna* to digest the blue-green algae.

The step (a) further comprises a step of: (a2) improving field stability of the *Daphnia magna*, so as to enable the *Daphnia magna* to be living in the field and to control a growth of the blue-green algae. The step (a) further comprises a step of: (a3) improving anti-toxic ability of the *Daphnia magna*, so as to enable the *Daphnia magna* to survive the toxin of the blue-green algae.

Further more, the step (a) further comprises a step of: (a4) improve a size of the *Daphnia magna*, so as to enable the *Daphnia magna* to eat nodular blue-green algae. The nature *Daphnia magna* is 2-4 mm long in average. But by step (a3), the length of *Daphnia magna* is improved to 4-6 mm. the longer of the *Daphnia magna*, the more capability the *Daphnia magna* have to eat nodular blue-green algae.

In step (a) of the present invention, the tamed *Daphnia magna* is called "algae eating plankton". By a process of taming, purifying, rejuvenating, the *Daphnia magna* only digest the blue-green algae.

It is worth mentioning that the *Daphnia magna* produce a weakly acidic excretory product that lower the PH value of the water body, which is capable of controlling the growth of the blue-green algae, because the outburst of the blue-green algae needs high PH value. An experiment proves that the weakly acidic excretory product of the blue-green algae lowers the PH value of the water body from PH 8.0-9.5 to PH 6.5-8.0.

In step (b), a density of the algae eating plankton put in the water body is 2-6 piece per liter, or 5-10 kilogram per 666.67 square meters. It is worth mentioning that in the present invention, when the density of algae eating plankton is 60-100 per liter, the best eating result can be got. The transparency of the water is improved from 30-50 cm to 100-150 cm, after algae eating plankton eat the algae.

Using algae eating plankton to control the water pollution does not need any huge investment, electricity power, or any chemical agent. The method only utilizes a food chain between the creatures, forming a healthy ecosystem.

The method of ecological restoration of water bodies containing excess nutrient according to a preferred embodiment further comprises a step of: (c) planting submerged plant in the water, wherein the submerged plant includes submerged forest and submerged turf.

In winter, the submerged forest mainly includes *Potamogeton crispus*. And in summer, the submerged forest mainly includes *Vallisneria spiralis, Vallisneria spinulosa, Ottelia alismoides, Potamogeton malaimus, Potamogeton pectinatus, Potamogeton maackianus, Batrachium trichophyllum, Myricphyllum spicatum*.

In winter, the submerged turf mainly includes *Elodea Canadensis*. And in summer, the submerged turf mainly includes *Hydrilla verticillata, Chara, Najas minor, Najas major, Ceratophyllum demersum*.

The coverage rate of the submerged plant in winter of the method is 25-30%, and in summer the coverage rate of the submerged plant of the method is 40-60%. The coverage rate can be adjusted according to the pollution degree.

After the blue-green algae are eaten, the transparency of water body is increased. The sunshine can radiate to the bottom of the water, so as to foster a growth of the submerged plant. The algae eating plankton not only eats algae, but also the suspending substance, including algae, organic detritus, suspending bacteria and mud, so as to greatly improve the transparency of the water body.

After the submerged plant is planted, the submerged plant and algae eating plankton are symbiosis in a harmony eco-system, so that it is easier to architect a landscape under water.

The submerged plant not only purifies water, but also forms splendid landscape under water.

It is worth mentioning that the algae eating plankton also produce an excretory product rich in carbon especially DIC (dissolved inorganic carbon), which is important to the growth of the submerged plant, so that in the preferred embodiment, the submerged plant can quickly rebuilt and restored beyond imagination. Experiments prove that the submerged plant grows 2-5 times faster than normal.

Optimize the submerged plant including the submerged forest and submerged turf, by diversifying the plants and enlarging the planting area. The submerged plant substituting unicellular algae does photosynthesis under water, and releases a large amount of dissolved oxygen, so as to absorb excess nutrient such as nitrogen and phosphorus, and restrain the growth of unicellular algae in the long run. Therefore, the water body containing excess nutrients primarily purifies itself. The submerged macrophytes can also produce some allelochemicals, which can limit the overgrowth of unicellular algae.

After step (c) of planting submerged plant in the water, the method of ecological restoration of water bodies containing excess nutrients according to a preferred embodiment further comprises a step of: (d) putting microbes in the water body, wherein the microbes can symbiose with the algae eating plankton.

The microbes diffuse with algae eating plankton to the substrate, and increase the oxidation-reduction potential, which foster the growth of the aquatic insects and aquatic animals. The aquatic insects and aquatic animals in symbiosis system can absorb nutrient in the substrate, so as to purify the water body.

The microbes are widely distributed on the tissue, such as root, stalk, leaf of the submerged macrophytes including submerged forest and submerged turf. The microbes in the water have a denitrifying and dephosphorizing efficiency 3-10 times higher than normal case. The microbes also are capable of fostering a growth of the submerged plants. Therefore, microbes assist a self-purification of the water body.

In step (d), with help of the microbes, the root, stalk, leaf of the submerged macrophytes can convert the 80-89% of the nitrogen into nitrogen gas, and convert the 10-15% of the nitrogen into protein of the submerged plant. And with help of the microbes, the root, stalk, leaf of the submerged plant can convert the 70-76% of the phosphorus into calcium phosphate, and convert the 20-25% of the phosphorus into organic matter of the submerged plant.

The algae eating plankton and microbes can keep the water body transparent for 3-4 months. And when the submerged plant is restored, all plants and animals can keep the water body transparent for decades.

The method of ecological restoration of water bodies containing excess nutrient according to a preferred embodiment further comprises a step of: (e) putting at least one selected from advanced aquatic animals consisting of snail, shellfish, shrimp, fish in the water body. The algae eating plankton and submerge plant can be eaten by the advanced aquatic animals consisting of snail, shellfish, shrimp, fish.

The snail is *Radix auricularia* in the preferred embodiment, which can effectively scratch the dust and organic crumb attached on the leaves, so as to enable the submerge plant obtaining more lights to grow healthily. The symbiosis of the living creatures under water increases the oxidation-reduction potential, which fosters the growth of the aquatic insects and aquatic animals, and assists the excess nutrient transfer quickly. The symbiosis system of algae eating plankton and submerge macrophytes will introduce the ecology restoration of all kinds of benthos such as snail, molluscs, aquatic insect et al, and transfers all benthic detritus and algae effectively, Increase the nutrient cycle deeply.

The method of ecological restoration of water bodies containing excess nutrient according to a preferred embodiment further comprises a step of: (f) fishing the finfish and shellfish, for transferring the nitrogen and phosphorus out of water body and keeping balance of the ecosystem in the water body.

The method of ecological restoration of water bodies containing excess nutrient according to a preferred embodiment further comprises a step of: (g) putting carnivorous aquatic animals that can eat advanced aquatic animals, for keeping balance of the ecosystem in the water body.

The method of ecological restoration of water bodies containing excess nutrient according to a preferred embodiment further comprises a step of: (h) when the pollution is getting worse or constant, putting algae eating plankton as emergency, so as to adjust the balance of the ecosystem.

The algae eating plankton, as the most elementary consumer is the bottom of the food chain. All omnivorous animals or flesh-eaters can eat the algae eating plankton, so that the algae eating plankton can be easily eliminated, and won't danger any biologic security. The application of the algae eating plankton to control the blue-green algae pollution is to transfer the nutrient of nitrogen and phosphorus into the higher animals through food chain, and capture the higher animals out of water, so as to eliminate the nutrient in the water body, and finally restore the ecosystem without second pollution.

The measurement indicates that the algae eating plankton is rich in nutrition, after eating the blue-green algae, wherein the active substance such as unsaturated fatty acid and amino acid contained in the algae eating plankton is three times of those in meat, 20 times of those in vegetables, so as to provide nutrient for fish, shrimps, crabs and birds, or even to be developed to be Animal Protein Source for human beings.

The method of ecological restoration of water bodies containing excess nutrient of the present invention is not only a method of eating algae, but also a method of leading an explosive ecosystem for the creature of all level.

Finally maintain the ecosystem, add algae eating plankton as emergency, and optimize the biologic species for further lowering the nutrient content in water, after the ecosystem is restored, so as stabilize the quality of the surface water to meet the standard for drinking. The transparency of surface water will reach over 2 meters.

The method of the present invention can ensure the clearance of the algae, nitrogen, phosphorus and COD (chemical oxygen demand) in the water body. The removal rate of the algae, nitrogen, phosphorus and COD are 99-100%, 90-95%, 80-90%, and 75-80% respectively. After the submerged plant that play a major role for the water-purification is resumed, and the aquatic plants, such as water lilies and lotus, should also be resumed. Further, the original part of the water indigenous aquatic insects, benthic worms, Oligochaete, benthic snail, benthic clam, fish, and part of water fish are resumed. The ecological balance is fully stabilized. And further more, a maintenance and operation criterion for the follow-up ecological balance should be established.

Example 1

The present invention was experimented in Dianchi Lake, Yunnan province, China. After a week, the tamed *Daphnia*

*magna* have reduced the blue-green algae from 1 billion pieces per liter to 5 million pieces per liter.

Example 2

The present invention was experimented in Yuanmingyuan Park, Beijing, China. After 20 days, the tamed *Daphnia magna* have reduced the blue-green algae from 55-70 g/m$^3$ to 0-5 g/m$^3$, lowered down more than 90% of chlorophyll a, and raised water transparence from 30-40 cm to more than 150 cm.

After cooperated with the submerged plant for two years, ammonia nitrogen in the water body reduced from 0.512-0.644 mg/L to 0.140-0.426 mg/L, nitrite nitrogen reduced from 0.05-0.06 mg/L to 0.007-0.009 mg/L, total nitrogen reduced from 5-6 mg/L to 0.80-1.02 mg/L, reactive phosphorus reduced from 0.052-0.075 mg/L to 0.012-0.029 mg/L, average reduction rate of ammonia nitrogen is 83.09%, average reduction rate of nitric nitrogen is 66.08%, average reduction rate of nitrite is 59.33%, average reduction rate of phosphate is 83.14%, and average reduction rate of Chl a is more than 99%.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of ecological restoration of water bodies containing excess nutrient, comprising:
   (a) taming *Daphnia magna* to be able to eat blue-green algae as an algae eating plankton with a taming composition fermented from spirulina powder, active yeast, and saccharide, so as to digest blue-green algae in the water bodies, and
   (b) putting said algae eating plankton in the water body containing excess nutrition and blue-green algae, wherein said algae eating plankton eats the blue-green algae, so that an eco-system of the water body containing excess nutrient can be restored.

2. The method of ecological restoration of water bodies containing excess nutrient, as recited in claim 1, wherein the taming composition is produced by a process comprising: dissolving saccharide and spirulina powder separately with water under 35-45° C.; activating the yeast in the saccharide solution for 1-60 minutes; pouring the spirulina suspension into the activated yeast suspension; and then composite fermenting for at least 1 hours.

3. The method of ecological restoration of water bodies containing excess nutrient, as recited in claim 2, wherein the process further comprises adding 5%-30% banana skin in volume while fermenting.

4. The method of ecological restoration of water bodies containing excess nutrient, as recited in claim 3, wherein the proportion of spirulina power, active yeast, saccharide and water by weight is 1-20:1:1:10-100, the *Daphnia magna* is fed with the taming composition for 15-50 ppm per day.

5. The method of ecological restoration of water bodies containing excess nutrient, as recited in claim 4, wherein when feeding the *Daphnia magna*, 10-200 ppm photosynthetic bacteria is added, dissolved oxygen in the water taming the *Daphnia magna* is kept in 3-4 ppm, pH of the water taming the *Daphnia magna* is adjusted approximate to 8, so as to simulate an alkaline environment when the *Microcystis aeruginosa* outbreak.

6. The method of ecological restoration of water bodies containing excess nutrient, as recited in claim 5, wherein the *Daphnia magna* is continuously tamed for at least three generations to obtain a stable algae eating plankton.

7. The method of ecological restoration of water bodies containing excess nutrient, as recited in claim 6, wherein in step (b), a density of said algae eating plankton put in the water body is 2-100 piece per liter.

8. The method of ecological restoration of water bodies containing excess nutrient, as recited in claim 6, further comprising a step of: (c) planting a submerged plant in the water body.

9. The method of ecological restoration of water bodies containing excess nutrient, as recited in claim 8, wherein said submerged plant is selected from a submerged forest consisting of *Potamogeton crispus, Vallisneria spiralis, Vallisneria spinulosa, Ottelia alismoides, Potamogeton malaimus, Potamogeton pectinatus, Potamogeton maackianus, Batrachium trichophyllum, Myricphyllum spicatum*.

10. The method of ecological restoration of water bodies containing excess nutrient, as recited in claim 9, wherein said submerged plant is selected from a submerged turf consisting of *Elodea canadensis, Hydrilla verticillata, Chara, Najas minor, Najas major, Ceratophyllum demersum*.

11. The method of ecological restoration of water bodies containing excess nutrient, as recited in claim 8, wherein a coverage rate of said submerged plant is 25-60%.

12. The method of ecological restoration of water bodies containing excess nutrient, as recited in claim 8, further comprising a step of: (d) putting microbes in the water body, wherein said microbes can symbiose with said algae eating plankton.

13. The method of ecological restoration of water bodies containing excess nutrient, as recited in claim 12, further comprising a step of: (e) putting at least one selected from advanced aquatic animals consisting of snail, shellfish, shrimp, fish in the water body.

14. The method of ecological restoration of water bodies containing excess nutrient, as recited in claim 13, wherein said snail is *Radix auricularia*.

15. The method of ecological restoration of water bodies containing excess nutrient, as recited in claim 13, further comprising a step of: (f) fishing said advanced aquatic animals, for transferring nitrogen and phosphorus out of the water body and keeping balance of an ecosystem in the water body.

16. The method of ecological restoration of water bodies containing excess nutrient, as recited in claim 13, further comprising a step of: (g) putting higher animals that can eat said advanced aquatic animals, for keeping balance of an ecosystem in the water body.

17. A process for producing a taming composition for taming the *Daphnia magna* to be able to eat blue-green algae as an algae eating plankton, comprising: dissolving saccharide and spirulina powder separately with water under 35-45° C.; activating the yeast in the saccharide solution for 1-60 minutes; pouring the spirulina suspension into the activated yeast suspension; and then composite fermenting for at least 1 hours.

18. The process, as recited in claim 17, further comprising adding 5%-30% banana skin in volume while fermenting.

19. The process, as recited in claim 18, wherein the proportion of spirulina power, active yeast, saccharide and water by weight is 1-20:1:1:10-100, the *Daphnia magna* is fed with the taming composition for 15-50 ppm per day.

20. A taming composition for taming *Daphnia magna* to be able to eat blue-green algae as an algae eating plankton, produced by a process comprising: dissolving saccharide and spirulina powder separately with water under 35-45° C.; activating the yeast in the saccharide solution for 1-20 minutes; pouring the spirulina suspension into the activated yeast suspension; and then composite fermenting for at least 1 hours.

* * * * *